Dec. 17, 1929.   C. S. MOOMY   1,740,029
METHOD OF AND APPARATUS FOR PRODUCING INNER TUBES OR OTHER ARTICLES
Filed Oct. 15, 1927   2 Sheets-Sheet 1
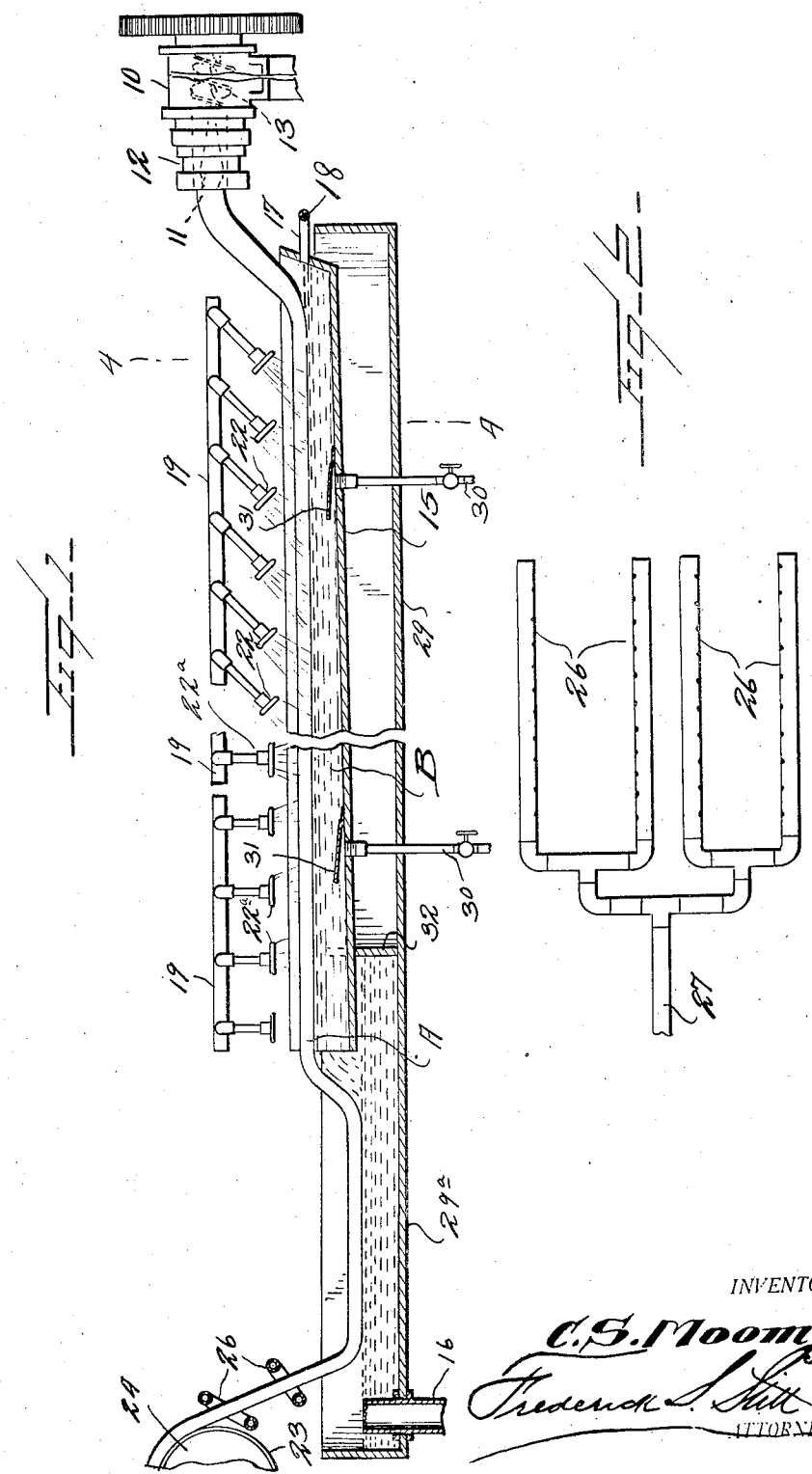
INVENTOR.
C. S. Moomy
Frederick S. Hitt
ATTORNEY

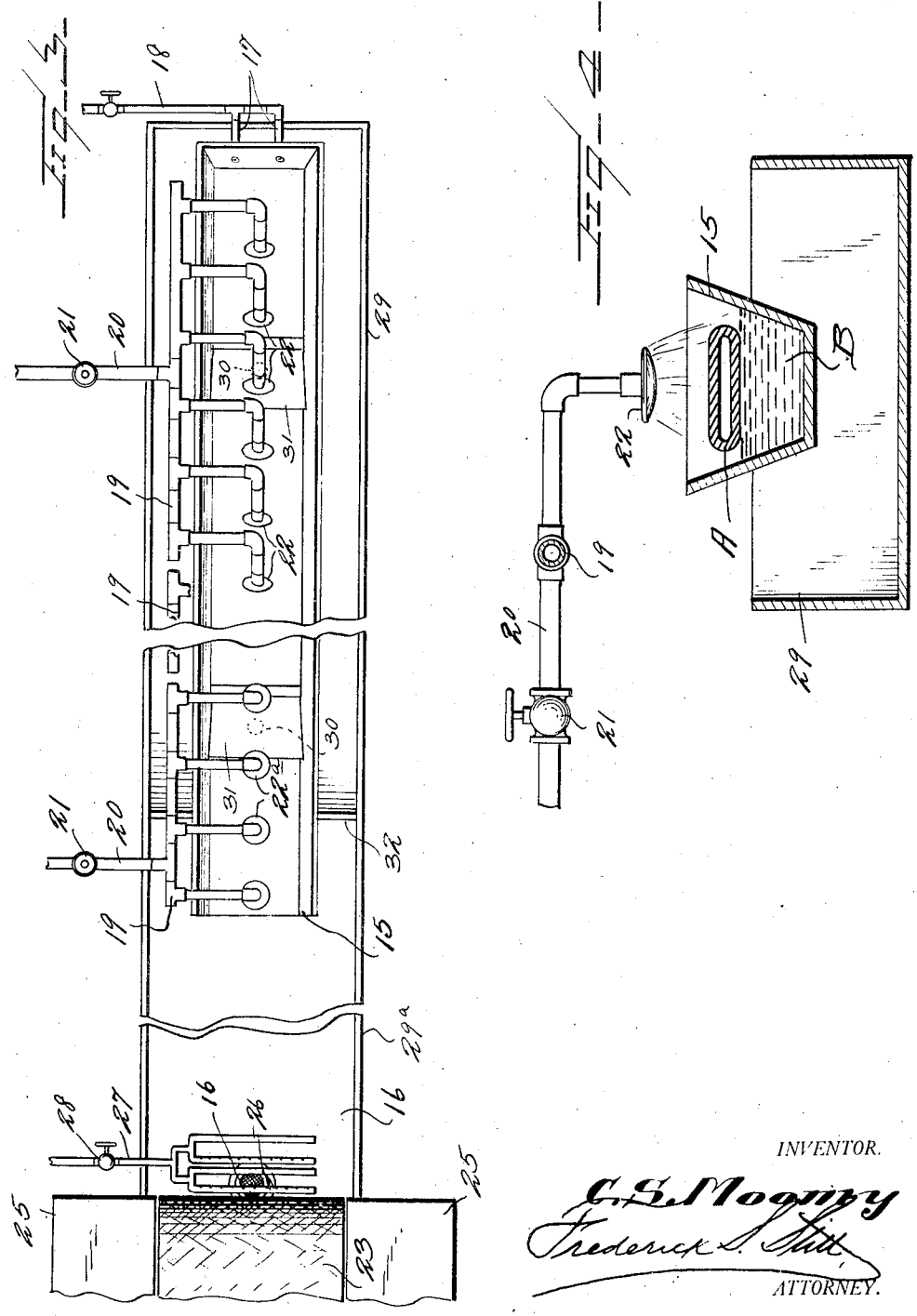

Patented Dec. 17, 1929

1,740,029

UNITED STATES PATENT OFFICE

CHARLES S. MOOMY, OF CARLISLE, PENNSYLVANIA

METHOD OF AND APPARATUS FOR PRODUCING INNER TUBES OR OTHER ARTICLES

Application filed October 15, 1927. Serial No. 226,410.

This invention relates to means for forming tubular articles of thin rubber such, for instance, as inner tubes for automobile tires, and the invention particularly relates to a process of this character in which the raw rubber is extruded in the form of a tube from an extruding machine or "tuber", as it is called, and then is carried to a table where the raw continuous tube is cut into lengths as the inflating valve is put in place and is cemented in the form of an inner tube and from thence taken to the vulcanizers.

It has heretofore been attempted to make these tubular articles, such as inner tubes, by extruding machines, but one of the difficulties has been to convey the raw rubber tube to the forming table without unduly stressing or straining the rubber, without deforming it and without allowing it to surface cure. A further difficulty has been due to the personal equation of the operative feeding the rubber stock into the extruder—some operatives feeding faster than others and some slower which, when shifts change, causes the rubber tube when extruded and when it arrives at the forming table, to be of diameters differing, with the same extruding dies, within a range of about one-quarter of an inch and differing in thickness. Such a difference makes it difficult, if not impossible, to properly fit the unvulcanized inner tube within the vulcanizing machines which are designed to take a tube of exactly so many inches in diameter and thus "seconds" are produced.

The general object of the present invention is to provide a process and apparatus of such character that the raw rubber tube as it leaves the extruding machine may be conveyed to the forming table without any stress or strain, and in this connection to provide a water cooling system for the rubber as it is extruded, which will secure perfect curing of quick curing stock, eliminate deformation due to the natural shrinkage of the rubber and eliminate stresses caused by transferring the rubber from the extruder or tuber to the forming table, and deliver the rubber tube to the conveying belt of the forming table in complete repose as regards its natural shrinkage, that is, with all the shrinkage taken out so that the tube when it reaches the forming table has been entirely pre-shrunk and set.

A further object is to provide a method and apparatus of this character by which the tube is formed without being subjected to any influence that tends either to harden it or soften it by way of self-vulcanization or otherwise, so that every tube as it comes to the vulcanizing stage is in the same condition and without any vulcanization or surface curing due to its travel after leaving the extruding machine, it being obvious that if the continuous tube as it comes to the forming table is of uniform diameter and thickness that the work at the forming table will produce a uniform unvulcanized tube and that if the inner tubes, after being formed, are in a uniform condition, then a uniform period of vulcanization will produce uniform vulcanized tubes with a minimum of "seconds".

A still further object is to provide for this purpose a trough down which a current of water flows upon which the extruded rubber tube rests, and provide means for maintaining a constant low temperature in this current of water throughout its length, and provide means whereby both the under surface and the upper surface of the rubber tube will be subjected to the action of cold water.

Other objects will appear in the course of the following description.

My invention is illustrated in the accompanying drawings, wherein:—

Figure 1 is a fragmentary side elevation of my invention, the trough being broken away;

Figure 2 is a fragmentary elevation of the means for drying the tube prior to its passage onto the forming table;

Figure 3 is a top plan view of the structure shown in Figure 1;

Figure 4 is a transverse section enlarged through the troughs and tube, showing one of the sprays.

The drawings forming part of this application show diagrammatically that portion of the mechanism and that step in the process of forming inner tubes which is the particular object of my invention.

Referring to these drawings, 10 designates the extruding machine, which may be of any suitable character but which includes a male and female die 11 and 12 respectively and an expressing screw 13 which acts to force the rubber through the extruding die. Disposed in advance of the extruding die and extending at a slight angle downward therefrom is a trough or chute 15 which may be disposed on a slant of about four inches in, say twenty-eight feet. The length of this trough may be varied to any extent required but, as illustrated, it is assumed to be about twenty-eight feet long. This trough has upwardly and outwardly flared side walls and has an end wall at its upper end and at its lower end discharges into a trough portion 29ª to be described having an outlet 16 maintaining a constant level of water in trough 29ª.

Disposed at the upper end of the trough or chute 15 and discharging thereinto relatively close to the bottom are two spray pipes 17 which are connected by a valve controlled pipe 18 to a source of water. Extending longitudinally of the trough 15 and disposed above the trough are a series of spray pipes 19, shown as three in number, though any number of spray pipes may be used, each of the spray pipes being connected to a source of water by pipe 20 having therein a valve 21 whereby the discharge of water through the pipe may be controlled. Each of the spray pipes is provided with spray nozzles or heads 22 and those spray nozzles which discharge from the spray pipe 19, which is immediately in advance of the extruder 10, are disposed at such an angle to the longitudinal axis of the trough 15 that the sprays therefrom will be discharged downward and forward. All of the spray nozzles may, if desired, be disposed at an angle so as to discharge downward and forward but, as illustrated, only the first set of spray nozzles are disposed at an angle and the remainder of the nozzles 22ª discharge directly downward into the trough. These nozzles are disposed above the axial center of the trough.

Disposed in advance of the trough 15 is the forming table which includes an endless belt 23 passing at its rear end over a drum or roller 24. As illustrated, the upper flight of the endless belt or conveyor 23 is disposed above the level of the bottom of the trough. The table at which the operatives work to cut the continuous tube into lengths and apply the inflating valve thereto and bring the ends of each length of tubing together and cement them is not illustrated in detail, as this by itself forms no part of my invention. Suffice it to say that it includes the endless belt 23 before referred to and the tables 25 disposed on each side of the endless belt and at which the operatives stand.

The tube A of raw or uncured rubber is discharged in a constant stream, as it may be called, from the extruder and as it is discharged it moves forward and downward, as shown in Figure 1, into the water B which is flowing down the bottom of the trough 15. The water is flowing down the trough at the same speed or a slightly greater speed than that of extrusion, and thus the tube is floated down with the stream of water to the lower end of the trough. The tube as it rests upon the water is relatively flattened, as shown in Figure 4, and when the tube reaches the lower end of the trough the tube is carried upward over the roller 24 and the belt or band thereon, which belt or band runs at a relatively slow speed, or in other words at a speed not greater than the speed of extrusion, the flowing water and the tube as it rests upon the water.

Disposed between the lower end of the trough and the upper flight of the endless belt 23 are air spray pipes 26 which are arranged in pairs, each pair having one spray pipe above and one below the rubber tube, and these spray pipes are perforated so as to discharge air downward and rearward or toward the upper and lower surfaces of the rubber tube, this air acting to dry the tube and also acting to force back any drops of water which may ride up with the tube as it rises up over the roller 24. These air spray pipes 26 are connected to a pipe 27, in turn connected to any suitable source of air under pressure, this air being controlled by the valve 28. This air is relatively cold and acts to sufficiently dry the rubber tube before the tube is carried onto the endless belt 23 of the table.

The trough is of just sufficient width to accommodate the tube and permit the tube to flow with the water along the trough without bearing against the sides of the latter, the sides of the trough thus acting to center the tube with relation to the overhead spray heads or nozzles 22 so that every portion of the tube will be acted upon by the water; the lower portion of the tube resting upon the water in the bottom of the trough and the upper portion of the tube being subjected to sprays of cold water from the time it leaves the extruder until it rises up between the air spraying devices. The water may be of any depth within the chute or trough 15 but will be ordinarily, with a trough having the inclination stated, about four and a half inches deep at the discharge end.

The water which enters the trough at the upper end thereof through the spray pipes or nozzles 17 and the water which is discharged downward and forward by the inclined nozzles 22 performs the very important function of carrying the tube from the extruder to the table and not only supporting the tube in a manner which will not strain or stress the tube, but these sprays by their impact upon the tube act to exert a draft upon the tube or propel it along the trough without at the same time pulling or drawing the tube from the extruder any faster than it is desirable. The rapidity with which the tube is carried down the trough depends upon the adjustment of the valve or valves 21 which control the sprays issuing from the spray nozzles 22 and issuing from the nozzles 17 and it is by controlling the discharge of water from these inclined nozzles 22 and the nozzles 17 that I can control the diameter and thickness of the rubber tube so as to secure uniform diameter and thickness, thus securing an obsolutely uniform tube at the forming table even where there may be such variations in feeding rubber to the extruder as would ordinarily preclude the formation of a uniform tube. This controlling action is due to the fact that if the discharge from the sprayers 22 and 17 is cut down or reduced, the rubber tube as it issues from the extruder will immediately tend to increase in diameter due to a certain amount of back pressure or the inertia of the tube itself. If, on the other hand, the controlling valve 21 for the sprayers 22 and the sprayers 17 is opened so as to increase the discharge of water and increase the driving speed of these jets impinging upon the surface of the rubber tube, the draft on the rubber tube will be increased and the rubber tube will be carried away from the extruder at a greater speed and this will tend to reduce the diameter and the thickness of the rubber tube. The exterior diameter of the rubber tube may by this means be substantially varied. Thus if the extruder discharges a tube under ordinary circumstances which is three inches in exterior diameter when properly fed but which is less if improperly fed or greater if improperly fed, the tube may substantially vary. If the workman who has charge of this portion of the operation finds that the tube as it passes upon the work table has a diameter greater than the diameter which is desired, he immediately causes the water to be turned on in the sprays 22 and the sprays 17 with greater force, the degree of this increase depending entirely upon the reduction required in the tube. If, on the other hand, he finds that the tube is slightly too small in diameter, he has the velocity of the tube decreased by decreasing the amount of water discharged from the sprayers 17 and 22 by the controlling valve 21 and the tube immediately responds by becoming slightly larger.

I have found in actual practice that this means of controlling the size, within a certain range, of the tube as it issues from the tuber or extruder is extremely effective and that by this means undue variations in size can be immediately corrected and that by its means tubes of uniform diameter and thickness may be continuously produced even where the workmen who feed the extruding machine are changed which would ordinarily cause, for reasons heretofore stated, a change in the diameter of the tube due to the personal equation of the different workmen. If by any chance the tube as it comes upon the endless belt of the work table is of improper diameter, this particular piece of tube is simply cut away from the continuously discharged tube and is carried back and re-ground and again forced out through the extruder so that no scrap is wasted.

The water which is discharged from the spray heads 22 and 22ª and from the spray pipes 17 has a temperature of ordinarily between 35° and 50° F. The temperature of the rubber as it leaves the extruding machine is approximately from 190° to 200° F. The cold water, that is, water at the temperature stated, comes in contact with the heated rubber of the tube from the time the rubber tube leaves the extruder until the water is dried off and blown away by the air sprays 26 and this cooling of the rubber by the water keeps the rubber in the raw state and thus the rubber is uncured even on its surface when it is placed in the vulcanizers.

The water travels at a relatively rapid rate down the trough and the water is relatively shallow in the trough and thus keeps its temperature, particularly because of the fact that along the entire extent of the trough cold water at the temperature stated is being sprayed downward upon the tube and into the trough and thus the stream of water throughout its length is of uniform temperature and the tube is cooled all the way around both on top and bottom and this acts to set the rubber at the proper width and gauge. The treating of this rubber tube with cold water from the time it leaves the extruder until it arrives upon the work table takes out all shrinkage in the uncured rubber in one operation and at the same time controls the width and gauge of the tube. I thus secure by this water cooling system the eventual perfect curing of quick curing stock, I take out all shrinkage and I deliver to the endless belt of the work table a rubber tube which is in complete repose as regards its natural shrinkage and without the stresses that would otherwise be produced by transferring the tube from the extruder to the table.

Preferably the first spray nozzle 22 is disposed not more than ten inches from the extruder nozzles or dies and these nozzles may be disposed even closer to the extruding mouth of the machine, as I find that the closer the first nozzle is to the extruding machine, the more definite is the means for controlling the rubber and stopping it from surface curing. The water is preferably at a pressure of approximately thirty pounds, though obviously this pressure may be varied. Thus the pressure will be decreased when the rubber tube is too narrow or too small in diameter and the pressure will be increased if the rubber tube is larger in diameter than it should be. The water from the outlet 16 is cooled and pumped back through the spray nozzles so that the same water is re-cooled and used over and over again.

Preferably, though not necessarily, a trough 29 is disposed beneath the trough or chute 15 so as to take any drip therefrom. I have found in actual practice that it is advantageous that the trough 15 shall be relatively shallow and the depth of water in the trough be relatively small, as this tends to keep the water cool, as with a deep trough it is relatively difficult to keep the large amount of water which the trough would contain in a properly cooled condition by the cooling sprays and a great deal more water would be used than would be necessary and a pump of greater power would be required.

In order to maintain the water in the trough 15 constant and prevent any warming up of this water, I provide the water inlet pipes 30 of any desired number and character, which may extend up through the bottom of the trough 15 and discharge cold water into the trough. The water pipes 30 are connected to the same water supply which provides water for the spray nozzles so that the water so discharged into the trough 15 is at the same temperature as the water discharged from the spray nozzles and from the jets 17. The water which passes through the pipes 30 is caused to flow in the direction of the general water current, that is away from the extruder, by means of the deflector plates 31 which, as shown in Figure 1, are attached to the bottom of the trough and extend forward and over the corresponding pipes 30, these deflector plates having a width equal to that of the trough and fitting the upwardly inclined sides of the trough at the ends of each deflector plate. Thus the water which is discharged through the pipes 30 is caused to flow in the direction of the current in the trough and this constant inflow of cold water into the trough maintains the water in the trough at a constant low temperature.

Preferably a partition 32 extends upward from the lower trough 29 and fits around the trough 15. The water flowing out the end of the trough 15 into the forward portion 29ª of the trough 29 fills this portion 29ª to the level of the upper end of the outlet pipe 16. This water is relatively quiet at this point and the rubber tube, as shown in Figure 1, floats downward onto the level of the water in the trough portion 29ª and is then carried upward over the endless belt of the work table in the manner heretofore stated, while being simultaneously sprayed with air from the nozzles 26 to dry the tube. The object of permitting the tube A to pass from trough 15 onto a relatively quiet body of water in the trough portion 29ª is to prevent the tube from being strained or pulled as it passes upward and onto the belt of the work table, which, of course, moves at a speed no greater than the speed of the tube passing down the trough 15.

In the practice of this invention, an operative feeds masses of vulcanizable rubber compound into the extruding machine. In this manner the rubber is ground up very finely and discharged through the extruding die in the form of a rubber tube. The tube is extruded and immediately passes down into the water in the trough and is carried along by the water in the trough and supported thereby until it reaches the work table. Here it is raised so as to pass onto the endless belt of the work table and passes along this endless belt. At the entrance end of the work table a workman is placed whose business it is to caliper the tube at short intervals so as to see that the diameter of the tube is correct. If the tube has a greater diameter than it should have, the pressure of water in the sprays 22 is increased so as to increase the speed of movement of the tube and draw the tube more rapidly from the extruder. If, on the other hand, he finds that the tube is getting smaller than it should be, the pressure and speed of the water is decreased immediately and thus the diameter of the tube increases. This workman also keeps an eye out for defects in the rubber tube caused, for instance, by small particles of sand or other foreign matter being extruded with the rubber. These defective parts of the tube are cut away and returned to be re-ground. This workman also cuts the tube into lengths by means of a gauge and other workmen along the bench insert and cement the inflating valve in place and telescope the ends of each section of tube into each other, cementing these ends. Thus a complete but unvulcanized tube is formed and this operation is continuous so that the machines may produce inner tubes night and day for any desired period of time without any variation in the character of the tubes due to a change of operatives feeding the extruder. Inasmuch as the tube floats down upon the surface of the water, it is possible to immediately detect any defects in the raw rubber so that these defective portions may be cut out and the raw rubber used over again.

It is again reiterated that variations in the work of operatives compared with each other at the extruding machine causes variations in size, both in thickness and diameter of the raw rubber tube as it comes out of the extruding machine, but by the use of this water control system I can produce tubes continuously from the beginning of each week to the end of each week and yet secure a uniform production even with different operatives operating on the same extruding machine. The use of cold water is particularly important, as thereby it prevents surface curing before the rubber tube arrives at the vulcanizing mold. This would be caused by the use of quick curing material and it is this quick curing material which permits rapid vulcanization and, therefore, rapid production. By this system the uncured rubber is retained in its uncured condition until it arrives in the mold, then in the vulcanizing mold a definite cure is secured and rubber is produced that will, properly handled, make perfect joints and perfect tubes. With this system it requires only about twenty-five minutes from the time the tube passes from the extruder to the time it leaves the vulcanizers— a completely vulcanized inner tube. In other words, the tube can be vulcanized very quickly because it is possible to vulcanize or fully cure the rubber within six minutes.

I claim:—

1. A method of controlling the diameter of a tubular rubber article discharged from an extruder consisting in carrying away the article on a water bed flowing away from the extruder at a speed approximately that of extrusion, and increasing or decreasing this speed to thereby decrease or increase the diameter of the article.

2. A method of treating a tubular rubber article discharged from an extruder consisting in guiding the article as it emerges from the extruder onto a bed of water flowing in a direction away from the extruder and at a speed approximately the same as the speed of extrusion, and discharging jets of water onto the article in a direction to cause the article to move away from the extruder.

3. A method of treating a tubular rubber article continuously discharged from an extruder consisting in directing the article onto the surface of a bed of cold water flowing in a direction away from the extruder and supporting the article thereon by its own buoyancy throughout the length of the bed and discharging sprays of cold water upon the top of said article as it floats down the bed, certain of the sprays discharging in a direction at an acute angle to the article and in a direction away from the extruder to thereby act to propel the article down the water bed.

4. A method of controlling the diameter of tubular rubber articles discharged from an extruder consisting in directing the rubber article onto a water bed, propelling the article along the water bed by sprays directed against the article at an acute angle thereto and in a direction away from the extruder, and increasing or decreasing the force of impact of said sprays to thereby increase or decrease the speed at which the article is carried away from the extruder and respectively decrease or increase the diameter of the tubular article.

5. A method of conveying a rubber article from an extruder through which the rubber article is continuously discharged and simultaneously controlling the diameter of said article and preventing the article from surface curing consisting in directing the article as it passes from the extruder onto a bed of cold water flowing in a direction away from the extruder and propelling said article down the bed by means of sprays discharged against the article at an acute angle thereto and varying the force of the sprays to thereby control the diameter of the article.

6. An apparatus for preparing rubber articles including means for continuously extruding rubber, a trough into which the rubber is discharged from said means, means for causing water buoyantly to flow along said trough, the water supporting and simultaneously conveying the rubber article along the trough in a direction away from the extruder and means for controlling the rapidity of movement of the article along the trough.

7. An apparatus for preparing tubular rubber articles including an extruder, a trough into which the extruded article is discharged, means for causing water to flow along said trough and upon which the rubber article rests and is buoyantly supported means for discharging sprays of water onto the article as it passes along the trough, the sprays being discharged in a direction away from the extruder, and means for controlling the force of impact of the sprays upon the article to thereby control the size of the article.

8. An apparatus for preparing rubber articles including an extruder, a trough inclined downward in a direction away from the extruder, means at the head end of the trough for discharging water thereinto to thereby provide a stream of water flowing down the trough upon which the extruded article will rest and float, and means for discharging sprays of water against the article whereby to propel the article along the trough, and means for controlling the rapidity of movement of the article down the trough.

9. An apparatus for preparing tubular rubber articles including an extruder, a trough into which the extruder discharges the article, the trough being inclined in a direction downward and away from the extruder, means for discharging jets of water into the upper end of the trough rearward of the point where the rubber article reaches the trough to thereby form a stream of water flowing down the trough upon which the article may be supported and travel, and means for discharging jets of water onto the article and in a direction toward the lower end of the trough to thus assist in propelling the article.

10. Means for conveying a rubber tube from an extruder consisting in a trough into which the extruder discharges the article in the form of a buoyant tube, means for causing a flow of water down said trough, upon which water the tube will float, and means for discharging jets of water at an acute angle to the rubber article and against the same and away from the extruder to thereby assist the movement of the rubber article away from the extruder.

11. Means for forming tubular rubber articles including an extruder, a conduit inclined away from the extruder and into which the extruder discharges, manually controllable means for discharging jets of cold water into the upper end of the trough to thereby cause a flow of water down the bottom of the trough and upon which the article may rest, and means for discharging cold water upon the rubber article during its passage down the trough including a plurality of series of jets discharging downward onto the upper surface of the rubber article, certain of the jets being discharged at an acute angle to the rubber article and toward the lower end of the trough to thereby assist in carrying the rubber article away from the extruder, and means for controlling the amount of water flowing down the trough and the force of impact of the jets against the rubber article.

12. A method of making rubber tubing which includes extruding the tubing and simultaneously subjecting it to the action of a cooling fluid moving in a direction at an angle less than a right angle to and in the direction of movement of the extruded tubing, whereby to support a length of tubing by its own buoyancy upon the surface of the water.

13. A method of making rubber tubing which includes extruding the tubing and simultaneously subjecting it to the action of a regulatable jet of fluid moving in a direction at an angle less than a right angle to and in the direction of movement of the extruded tubing.

14. A method of making rubber tubing which includes extruding the tubing and simultaneously subjecting it to the action of a regulatable jet of fluid moving in approximately the same direction as the extruded tubing.

15. A method of making rubber tubing which consists in extruding the tubing onto the surface of a current of cold water whereby the tubing is supported by its own buoyancy upon the surface of the water and is bodily carried along with the current discharging sprays of cold water onto the article as it moves downward with the current, and forcing cold water into the current of water at predetermined points.

16. A method of making rubber tubes which consists in extruding the rubber onto a current of cold water flowing away from the extruder, discharging sprays of cold water onto the article, discharging cold water upward into said current and directing the cold water so discharged in the direction of the flowing current, the water discharged into the current being of the same temperature as the water of the sprays.

17. An apparatus for preparing rubber tubing including a rubber extruder, a water trough and means for buoyantly supporting a length of rubber tubing equal to the length of the trough and carrying this length of rubber tubing bodily along the trough while simultaneously cooling it, consisting of a water bed flowing along the trough and away from the extruder and upon the surface of which the tubing is buoyantly supported and by which it is conveyed away from the extruder at a uniform speed such as to produce a proper draft upon the tubing as it issues from the extruder and means at the lower end of the trough for raising the tubing from the water and carrying it away.

18. An apparatus for preparing rubber tubing including a rubber extruder, a water trough and means for buoyantly supporting a length of rubber tubing equal to the length of the trough and carrying this length of rubber tubing bodily along the trough while simultaneously cooling it, consisting of a water bed flowing along the trough and away from the extruder and upon the surface of which the tubing is buoyantly supported, means at the lower end of the trough for raising the tubing from the water and carrying it away, and means for discharging jets of cold water onto the rubber tubing while it floats down the trough, certain of the jets being directed downward and forward.

19. A method of treating rubber consisting in continuously discharging from an extruder a rubber tube, directing the tube onto the surface of a bed of cold water flowing in a direction away from the extruder to thereby buoyantly support, cool and convey said rubber tube and simultaneously discharging sprays of cold water onto the article as it floats down the water bed, the sprays being directed away from the extruder to thereby propel the article and continually carry it away from the extruder, and raising one end of the tube so formed at the lower end of the water bed and conveying the tube away from this end of the water bed at a speed not greater than the speed of flow.

20. A method of making rubber tubing which includes extruding the tubing and simultaneously subjecting it to the action of a cold liquid moving approximately in the same direction as the extruded tubing and supporting the article upon the surface of the liquid, the flowing liquid exerting a predetermined draft upon the article as it is extruded.

21. A method of making rubber tubing which includes extruding the tubing and simultaneously subjecting it to the action of a regulatable current of liquid moving in approximately the same direction as the extruded tubing and buoyantly supporting the extruded tubing.

22. A method of making rubber tubing consisting in extruding the tubing in a hot condition upon the surface of a regulatable current of cold water flowing away from the extruder and in approximately the same direction as the extruder tubing, and maintaining the current of water at a predetermined temperature throughout its length.

In testimony whereof I affix my signature.

CHARLES S. MOOMY.